Sept. 17, 1940.                H. E. M. VESTERGREN                2,215,365
                                  TELEVISION PLANT
                               Filed July 24, 1937              2 Sheets-Sheet 2
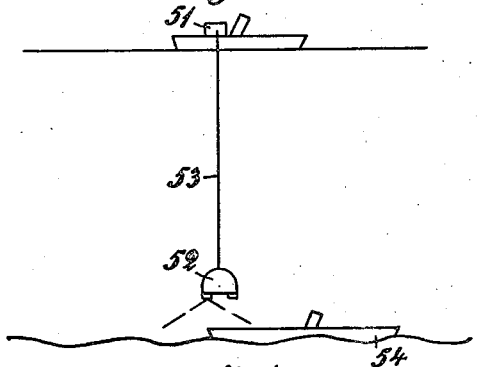
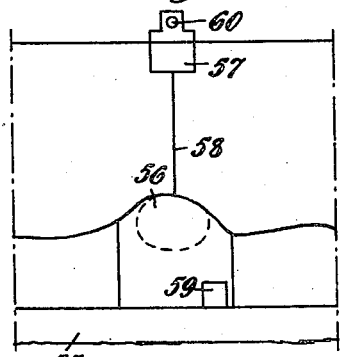
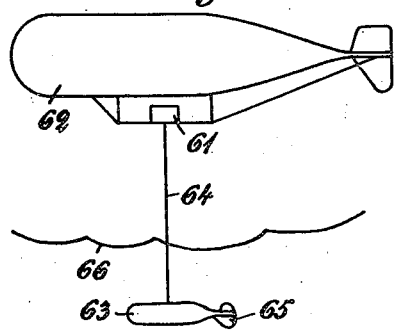
Harry Einar Maurits VESTERGREN
              INVENTOR
         BY:
         Haseltine Lake & Co.
                  ATTORNEYS.

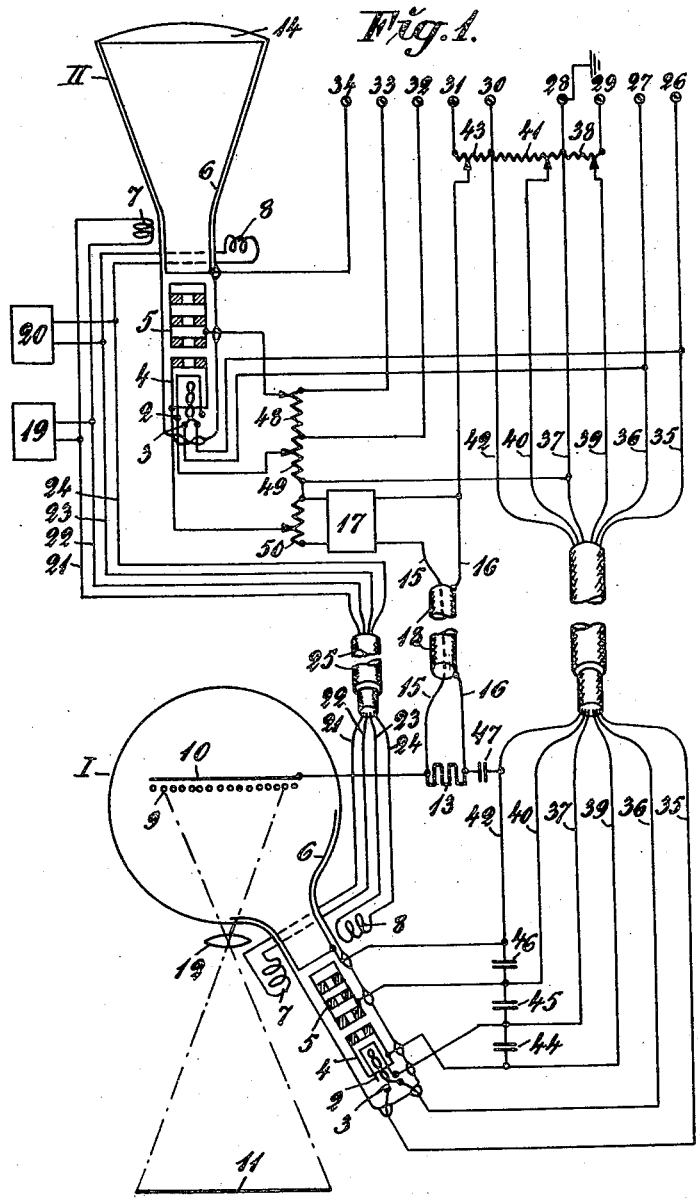

Patented Sept. 17, 1940

2,215,365

UNITED STATES PATENT OFFICE 2,215,365

TELEVISION PLANT

Harry Einar Maurits Vestergren, Stockholm, Sweden, assignor to Gustaf Sylven, Stockholm, Sweden Application July 24, 1937, Serial No. 155,502
In Sweden July 28, 1936

7 Claims. (Cl. 178—6.8)

The present invention has for its object to provide a simple television plant facilitating visual observation at a distance of objects or ranges which cannot be observed directly, or which for some reason or other it is desired or preferred to observe indirectly by means of television.

Thus the arrangement according to the invention is serviceable for scanning of pictures under water and for observation of the pictures at a distance from the place of scanning, for instance on board a ship at the surface of the water or in a submarine vessel, from which the picture-scanning apparatus or transmitter has been lowered. Through the arrangement in question it will thus be possible, for instance, from a salvage vessel to examine objects lying submerged in water at such a depth that divers cannot descend to the same, or to examine objects lying at a lesser depth, in order to localise the objects, and so forth, before the divers descend. By means of the arrangement according to the invention, it is also possible to perform salvage work without the use of divers, the arrangement permitting observation of gripping tools or the like, that have been lowered to the wreck, submarine cable or the like which it is desired to raise. These observations provide a guide for the operation of the gripping tools and so forth so that they may be operated in the most suitable manner from the salvage vessel.

The arrangement according to the invention may also be utilised to facilitate observation of the range above the water surface from a submarine boat in submerged position, the arrangement being then superior to the ordinary periscope in that it permits observation from the submarine vessel, no matter how deep the position of the latter may be. Likewise, the arrangement is suitable to permit observation of the range below a cloud from an airplane or an airship above said cloud.

The television plant according to the invention is principally characterised in that its transmitter and receiver are connected by means of electric conductors comprised in one or more cables, besides which the currents and tensions required for the functioning of the transmitter are arranged entirely or in part to be transmitted and/or regulated over conductors in said cable or cables from a current-supplying outfit provided on the receiver side.

Moreover, all or some of the circuits by means of which electric energy is transmitted from the receiver side to the transmitter are, in a suitable embodiment of the invention, provided with controlling means to make possible an adjustment of the current strength of tension of the supplied energy to a suitable value. These and other features characteristic of the invention will be set forth more closely in the following.

The invention will be described in greater detail in the following with reference to a few examples of embodiment illustrated in the accompanying drawings and serving to elucidate the same. In the drawings, Figure 1 represents a simplified diagram of the circuit arrangement pertaining to an embodiment of the invention, while Figures 2, 3 and 4 also illustrate diagrammatically the application of the invention for various purposes.

The diagram shown in Figure 1 relates to a plant, in which the transmitter as well as the receiver are devised with a cathode ray tube according to principles set forth by V. K. Zworykin. The transmitting tube I as well as the receiving tube II are provided in a manner known per se with an indirectly heated cathode 2 with a heating filament 3, a grid 4 surrounding the cathode in a cylindrical manner and two anodes enclosing the electron ray, one of which anodes 5 is adjacent the grid and in front of the latter in the intended direction of the cathode ray, while the other 6 is in front of the first-mentioned cathode, reckoning in the same direction and adjoins the inner walls of the enlarged front portion of the tube. The grid and the anodes form the electron optic of the tube and are shaped so that when connected to suitable tensions they form within the tube an electron ray as concentrated as possible of a portion of the electrons emitted from the heated cathode.

Beside the end of the other anode adjacent the cathode there are arranged deflecting coils 7 and 8 located externally in known manner and arranged in such a way that upon a passage of current they create fields in directions at right angles to each other in a plane perpendicular to the path of the cathode ray. When the coils 7 are excited by means of alternating currents of a pointed curve shape and of a frequency which is equal to the number of frame changes per second, while the coils 8 are at the same time excited by means of a corresponding alternating current of a frequency corresponding to the number of line changes per second, an analysis or scanning of pictures is obtained in the transmitter and a reproduction of pictures in the receiver in accordance with known principles. The analysis of scanning of the pictures then takes place in the transmitter by the electron ray being caused by means of the deflecting coils consecutively to scan a very great number of small photo-electric cells 9, which are insulatingly arranged on a collector plate 10, when a picture of the object or the range 11 to be televised is projected by means of a lens system 12 on the surface formed by all the photo-electric cells 9.

Here, the electron ray will for each picture point that is passed give rise to a discharge current through the circuit of the plate 10, which current is proportional to the illumination at this point of the picture during the time from the next preceding passage of the electron ray. As the picture points are mutually illuminated differently, a variation will thus be obtained of the current strength in the said circuit, and this variation may be taken out, as a potential variation suited for amplification, over a resistance 13 connected into the circuit. In the receiving tube, the reproduction of the pictures is brought about in that the electron ray, the current strength of which is modulated in unison with the amplified potential variations from the circuit of the plate 10, in passing over the fluorescent picture layer 14 of the receiving tube II gives rise to light effects which at every point of the picture correspond to the current strength of the electron ray and thus to the illumination at the corresponding point of the picture projected on the picture surface formed by the photo-electric cells 9.

Now, in the arrangement according to Figure 1, the circuit for the modulation of the receiver grid by means of the potential variations obtained from the resistance 13 is carried, according to the invention, by metallic conductors 15 and 16 between the transmitter and the receiver. An amplifier 17 of any arbitrary suitable type is arranged here at the receiver to amplify the potential variations to a suitable amplitude. Hereby all complicated arrangements are avoided, which are required in the wireless transmission of ordinary television. The conductors 15 and 16 are preferably arranged in a concentric cable 18, whereby disturbances in the circuit formed by these conductors are reduced.

In the receiving apparatus there are further arranged a scan generator 19 for the generation of alternating current to the coils 7 and a second scan generator 20 for the generation of alternating current to the coils 8. The coils 7 of the transmitting tube as well as of the receiving tube are connected to the generator 19 through a metallic circuit, and the coils 8 of the tubes are connected in the same manner with the generator 20 through a metallic circuit. The four conductors 21, 22, 23 and 24 required for this purpose from the transmitter are extended, according to Figure 1, through a cable 25. This arrangement ensures directly and without special complicated auxiliary means that the electron rays of both tubes will perform their movements over the respective picture surfaces entirely synchronously both with respect to line changing and frame changing.

To facilitate the arrangement of the transmitter at a distance from the receiver in such a place where an observer cannot at all or cannot preferably stay, the arrangement according to Figure 1 is furthermore so devised that the supply of energy to the local circuits of the transmitting electron tube takes place, in operation, from suitable sources of current at the receiver through metallic conductors to the connecting terminals of the transmitting tube. This construction of the arrangement involves a double advantage. In the first place, the transmitting outfit becomes lighter and less bulky, in that the same need not be provided with the converting contrivances in the form of rectifiers and so forth which are normally required in order to generate from power mains or a battery the direct current potentials required for the anode and grid circuits and the low tension direct and alternating current required for the heating of the heater 3. Secondly, the current supply from the receiver side offers the possibility of locating potentiometers or similar devices in the said place for the adjustment of the currents and potentials of the transmitting tube to the most favourable values. The last circumstance is of particular importance for that reason that in operation the transmitting outfit is normally located at a distance from the observer, and is thus inaccessible for a direct actuation by the latter.

To the right of Figure 1 are shown a number of connecting terminals 26—34 which represent the connections for a converting or current-supplying aggregate provided on the receiver side, but not shown in the drawings, said aggregate being adapted to serve the whole television plant. Between the terminals 26 and 27, a direct or alternating current of suitable tension is obtained for the heating filaments 3. The heating filaments of both tubes are connected to these terminals, the connection to the filament of the transmitting tube being effected by means of the conductors 35 and 36.

The cathode 2 of the transmitting tube is connected by means of the conductor 37 to the terminal 28, which is also connected to earth, according to the drawings. A suitable grid bias for the transmitting tube is obtained from the potentiometer 38 connected between the terminals 28 and 29, the movable contact of said potentiometer being connected to the grid of the transmitting tube through the conductor 39. The first anode 5 of the transmitting tube is connected by means of the conductor 40 to the movable contact of a potentiometer 41 connected between the terminals 28 and 30, said potentiometer permitting the adjustment of a suitable tension for this anode. The second anode 6 of the transmitting tube is directly connected with the terminal 30 by means of the conductor 42, from which terminal this anode will thus obtain its potential which is positive relatively to the cathode, and which for ordinary types of tubes preferably has a value of about 1000 volts, whereas the potential of the first anode only constitutes a fraction thereof. Finally, a suitable tension for the circuit of the plate 10 is obtained over the resistance 13 and so forth by means of the potentiometer 43 connected between the terminals 30 and 31, the movable contact of said potentiometer being connected through the conductor 16 to the opposite end, with respect to the plate 10, of said resistance, and thus also to the one intake terminal of the amplifier 17.

It is obvious that through said arrangement it will be possible from the receiver side to control the grid bias and the anode potential for the anode 5 of the transmitting tube, as also the tension for the circuit of the plate 10. Evidently, it is also possible in a corresponding manner to arrange the controlling facilities for the current strength of the heating filament 3 and for the tension on the anode 6.

In the arrangement according to Figure 1, the conductors 35, 36, 37, 39 and 40 are united into a cable per se between the transmitter and the receiver. Obviously, the conductors extending to the receiver may be comprised in a common cable or in a plurality of cables in some other manner than that shown in Figure 1. The division into a number of cables according to Figure 1, however, in certain cases involves advantages which are preponderant, among others that the conductors 21 to 24, which do not require so high an insulation, may be comprised in a cable of a rather simple nature.

As will be seen from Figure 1, the transmitting outfit shown therein also comprises four condensers 44 to 47. Of these, the condenser 44 is connected between the cathode and the grid, the condenser 45 between the cathode and the first anode, the condenser 46 between the first and the second anodes, and the condenser 47 between the second anode and the resistance 13. These condensers are selected with a comparatively large capacity so as to ensure that the tension between the connecting points of the respective condensers is maintained substantially constant, irrespective of variations with respect to the strength of current in the circuits in consideration, and thus also independently of external interferences that may be induced in the connection between the transmitting outfit and the current-supplying contrivances.

As shown in Figure 1, the receiving tube II has its second anode 6 connected with the connecting terminal 34, from which is obtained a tension which is positive relatively to the cathode, and which in the ordinary types of tubes is of the magnitude of 4000 to 5000 volts. For the first anode 5 of the tube II, a positive tension generally amounting to 1000 to 1500 volts is obtained from the movable contact of a potentiometer 48 which is connected between the terminals 32 and 33. A potentiometer 49 connected between the terminals 28 and 32 has its movable contact connected to the cathode, besides which the grid of the tube II is supplied, at a suitable bias, with the invariable picture current from the amplifier 17 by being connected with the displaceable contact of a potentiometer 50 connected into the output circuit of the amplifier. The connection of the amplifier 17 to the requisite source of current is not illustrated, since this connection may be devised in an arbitrary known manner.

Obviously, the invention is not limited to the arrangement of details shown in Figure 1. Thus it may be preferred in certain cases to divide the amplifier 17 into two units, one of which is contained in the transmitting outfit proper and arranged to amplify the potentials obtained over the resistance 13 to such an amplitude that one will to a great extent be independent of the generally unavoidable interference between the transmitter and the receiver. This amplifying unit arranged in the transmitter may then be supplied with the currents and the tensions necessary for the functioning thereof, either from sources of current, which are also provided in the transmitting outfit, or by means of conductors in the cable connection between the transmitter and the receiver, that is to say from the common current-supplying outfit.

The earth connection of the terminal 28 shown in Figure 1, which influences the screening of the arrangement from disturbing influences, may also be made in some other manner, for instance so that the first anode of the transmitting tube and the cathode of the receiving tube are grounded.

Instead of being provided with the deflecting coils 7 and 8, the tube I, or alternatively both tubes, may be fitted with deflecting plates for the deflection of the cathode ray in a capacitive way. Finally, the invention is not limited to the employment of the types of transmitter and receiver considered according to Figure 1, but may be carried into effect with arbitrary means of sufficient efficiency. For example, the transmitter may be of the type indicated by Farnsworth, in which the transmitter comprises an evacuated tube having a photo-electric cell formed as a picture plate, upon which a picture of the object and so forth to be televised is projected, besides which the electrons ejected from the picture points of this photo-electric cell are directed consecutively through a little aperture in an anode plate, whereupon the electron-ray through this aperture is amplified in an ordinary electron multiplier, before it is taken out in the form of a picture current from the transmitter. The connection between the transmitter and the current-supplying contrivance on the receiver side must then be adapted to the type of transmitting tube employed.

Figure 2 illustrates the general arrangement in the application of the invention for the scanning of pictures under water from a vessel at the water surface. The receiver 51 with the appurtenant outfit are mounted on the ship, while the transmitter or the picture scanning apparatus is arranged in the interior of a hollow bell 52 adapted to withstand pressure, said bell being arranged to be lowered from the ship by means of a carrying line and a windlass in any suitable manner. To enable the lowering of the cap this device together with the transmitter is or by means of weights is made heavier than the displaced volume of water. The carrying line and the cable connection between the transmitter and the receiver are indicated at 53. The bell 52 is provided on its lower side with a window, through which the transmitting device may catch the light emanating from the bottom, a wreck 54 or the like, so that television is rendered possible.

To make observations possible, even when the natural illumination is insufficient, one or more search lights of sufficient capacity are preferably arranged beside the receiver to illuminate the observed object or range. A search light arrangement of this kind may be provided in the same bell 52 as the transmitter, the bell being then fitted with windows for the search light also. A search light device adapted to be lowered per se may also be used, whereby the advantage is obtained, among other things, that the light falling upon the observed object or range may be caused to fall at a considerable angle relatively to the light reaching the transmitter, so that a picture richer in contrasts will be obtained of uneven objects or generally of objects producing a shadow. Likewise, the search light contrivance may be devised as a special unit, which when used is secured to the transmitter bell.

For observations under water, the arrangement according to the invention may also be advantageously constructed in such a manner as to operate with rays having a greater penetrating capacity in water than those of the visible spectrum. Thus, for instance, the search light contrivance may be devised for illumination with substantially infra-red rays, while the light-sensitive elements of the transmitter are selected at the same time to be sensitive towards these rays.

The bell 52 is preferably connected to the carrying line through the intermediary of Cardan rings or a similar arrangement so as to be swingable in different directions relatively to those of the carrying line. Here, special manoeuvring lines may be arranged between the ship and the bell to make possible any desired adjustment of the latter. For observations in great depths or in streaming water it is possible to employ an embodiment of the invention, in which the bell is provided with a motor-driven propeller and steering rudder, the motor as well as the rudder being then arranged to be operated at a distance from the ship, preferably by electric means.

Figure 3 illustrates the general arrangement of the application of the invention for observation of the range above the water surface from a submarine vessel in submerged position. Here, the vessel 55 is provided with a suitable connecting tower 56 with means for sending up a floating bell 57 containing the transmitting outfit, by means of a retention line 58, to which the connecting cable or cables between the transmitter and the receiver are attached. To enable the raising of the cap to the water surface the cap together with the transmitter is made lighter than the displaced volume of the water. The receiver 59 with the appurtenant outfit are arranged in an observation chamber in the submarine vessel. The floating bell 57 is provided with side windows 60, through which the scanning of pictures takes place, and is preferably also arranged to be rotated from the submarine vessel by means of a suitable outfit operable from a distance.

If desired, a greater or smaller portion of the horizon may at the same time be compassed by the transmitter, if use is made of suitably arranged mirrors, for instance in agreement with the principle of the periscope. Preferably the periscope or mirror device is adapted to enable observation round the horizon or observations of a part of the horizon and/or a field of sight more or less directly upwards by reflecting the light from the field of sight concerned into the optical system of the transmitter. Further, the periscope device may be arranged turnable or settable in different directions and a suitable remote control system may be provided to enable a person at the receiver to set the periscope device in any desired direction. Alternatively the transmitter cap as a whole may be arranged turnable or settable to any desired direction or position by means of a remote control system, controlled from the receiver.

Preferably, the transmitter cap is torpedo-shaped or formed in any suitable manner so as to enable a steady motion forward of the same cap when drawn along the water surface.

Fig. 4 finally illustrates the general arrangement in applying the invention to make possible observations from an airship in or above a cloud, of the range or the ground underneath said cloud. Here, the receiver 61 is arranged in the airship 62. The transmitting outfit is housed in a cap 63, which is torpedo-shaped with regard to the air resistance, and which may be lowered from the airship by means of a line 64. Alternatively, the line and the cable may, in this as in other cases, be made as a single structure. The cap 63 is provided with a vertical rudder, in order that it shall maintain its longitudinal orientation relatively to the airship at observations during travel. The cap is furthermore provided with observation windows for the transmitter, which latter is preferably arranged within the cap in such a manner that by being operated at a distance from the airship it may be adjusted in different directions to render possible an observation both in the lateral directions and downwardly. The lower limiting surface of the cloud is indicated in Figure 4 by the line 66.

The embodiments set forth have been chosen only as examples of carrying the invention into effect, and it will be readily understood that the arrangement can be modified in various other ways within the scope of the invention.

It may be pointed out in particular that the television plant devised according to the invention may be brought into use within a plurality of ranges other than those indicated hereinbefore. For example, it may be of importance, sometimes, to be able to inspect mine cavities filled with water or gas.

Having now particularly described the nature of my invention and the manner of its operation what I claim is:

1. In a television plant of the character described, including an electric television transmitter and an electric pick-up of the type in which the picture scanning is effected by deflection of an electron ray, the combination of means for placing the television pick-up at points which are at least difficult of access and preferably inaccessible altogether, and a number of conductors connecting the television pick-up with a television receiver for transmitting the television signals between the pick-up and receiver, and for transmitting all the requisite currents and voltages for the functioning of the transmitter from a current-supplying outfit on the receiver side of the plant, all the amplifying stages necessary for the amplification of the television signals being located exclusively on said receiver side of the plant.

2. A television plant according to claim 1, wherein the transmitter is housed in a watertight strong casing adapted to withstand pressure and having windows for facilitating operation of the optical part of the transmitter, said casing being adapted to be submerged to a desired depth beneath the surface of the water.

3. A television plant according to claim 1, wherein some of the circuits by means of which electric energy is transmitted from the receiver side to the pick-up have control means making possible and allowing adjustment of the current strength and voltage of the supplied energy to a suitable value.

4. A television plant according to claim 1, wherein the transmitter is housed in a watertight strong casing adapted to withstand water pressure and having at least one window for facilitating operation of the optical portion of the transmitter and a light, said casing being adapted to be submerged to a predetermined depth beneath the surface of the water.

5. A television plant according to claim 1, wherein the transmitter has an electric light associated therewith in a position effective to illuminate an area intended to be exposed to the scanning and operation of said transmitter.

6. A television plant according to claim 1, wherein the apparatus includes a plurality of transmitters connected to the one and the same pick-up in order to cover a larger or increased area than that coming within the capacity of one transmitter.

7. A television plant according to claim 1, wherein the conductors connecting the pick-up with the receiver include a concentric cable which contains the conductors in a compact form.

HARRY EINAR MAURITS VESTERGREN.